(12) United States Patent
Matsushita

(10) Patent No.: US 12,350,973 B2
(45) Date of Patent: Jul. 8, 2025

(54) TIRE

(71) Applicant: The Yokohama Rubber Co., LTD., Tokyo (JP)

(72) Inventor: Kotaro Matsushita, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 759 days.

(21) Appl. No.: 17/596,410

(22) PCT Filed: Jun. 10, 2020

(86) PCT No.: PCT/JP2020/022821
§ 371 (c)(1),
(2) Date: Dec. 10, 2021

(87) PCT Pub. No.: WO2020/250924
PCT Pub. Date: Dec. 17, 2020

(65) Prior Publication Data
US 2022/0305848 A1 Sep. 29, 2022

(30) Foreign Application Priority Data
Jun. 14, 2019 (JP) .................. 2019-110746

(51) Int. Cl.
*B60C 11/13* (2006.01)
*B60C 11/03* (2006.01)
*B60C 11/12* (2006.01)

(52) U.S. Cl.
CPC ...... *B60C 11/1369* (2013.01); *B60C 11/0304* (2013.01); *B60C 11/1263* (2013.01);
(Continued)

(58) Field of Classification Search
CPC . B60C 11/0304; B60C 11/0306; B60C 11/12; B60C 11/1263; B60C 11/13;
(Continued)

(56) References Cited

U.S. PATENT DOCUMENTS

2017/0129289 A1 5/2017 Ascanelli et al.
2017/0361659 A1 12/2017 Yamakawa
(Continued)

FOREIGN PATENT DOCUMENTS

CN 102039787 A 5/2011
CN 107000492 A 8/2017
(Continued)

*Primary Examiner* — Justin R Fischer
*Assistant Examiner* — Philip N Schwartz
(74) *Attorney, Agent, or Firm* — Thorpe North & Western

(57) ABSTRACT

A tire tread pattern includes a center land portion and an intermediate land portion on an outer side in a width direction thereof. A center land portion region includes no grooves, includes a first sipe having a wide width open to circumferential main grooves on both sides and includes a second sipe having a narrow width between adjacent first sipes and open to the circumferential main grooves on both sides. An intermediate land portion region includes an intermediate lug groove opening to a circumferential main groove in contact with the intermediate land portion. A circumferential direction distance between opening ends of the adjacent first sipes is equal to a distance between opening ends of adjacent intermediate lug grooves in which the region between at least some opening ends in the circumferential direction overlaps the region along the circumferential direction between the opening ends of the adjacent first sipes.

18 Claims, 6 Drawing Sheets

(52) U.S. Cl.
CPC ...... B60C 11/1281 (2013.01); B60C 11/1376 (2013.01); *B60C 2011/0341* (2013.01); *B60C 2011/0388* (2013.01); *B60C 2011/039* (2013.01); *B60C 2011/1286* (2013.01)

(58) Field of Classification Search
CPC ............. B60C 11/1376; B60C 11/1281; B60C 11/1369; B60C 11/1353; B60C 2011/1286; B60C 2011/0388; B60C 2011/0341; B60C 2011/1361
See application file for complete search history.

(56) References Cited

U.S. PATENT DOCUMENTS

2018/0297416 A1  10/2018  Ninomya
2020/0001655 A1  1/2020  Kouda et al.
2022/0242170 A1* 8/2022  Matsushita ......... B60C 11/1263

FOREIGN PATENT DOCUMENTS

| | | | | |
|---|---|---|---|---|
| CN | 108725100 | A | 11/2018 | |
| CN | 108819621 | A | 11/2018 | |
| CN | 109501528 | A | 3/2019 | |
| DE | 102008037563 | A1 * | 5/2010 | ......... B60C 11/0302 |
| JP | 2013-244907 | A | 12/2013 | |
| JP | 2014-162250 | A | 9/2014 | |
| JP | 2016-132441 | A | 7/2016 | |
| JP | 2017-24658 | A | 2/2017 | |
| JP | 2017-105346 | A | 6/2017 | |
| JP | 2018-2093 | A | 1/2018 | |
| JP | 2018-65429 | A | 4/2018 | |
| JP | 2018-122772 | A | 8/2018 | |
| JP | 2019-1232 | A | 1/2019 | |

* cited by examiner

TIRE

TECHNICAL FIELD

The present technology relates to a tire.

BACKGROUND ART

In the related art, in a tread pattern of a tire, provided are a plurality of circumferential main grooves extending in a tire circumferential direction and lug grooves and sipes traversing land portions defined in a tire width direction by two of the circumferential main grooves. An all-season pneumatic tire (hereinafter referred to as an all-season tire) is regarded as an intermediate tire between a regular so-called "summer tire" used during a non-snow season and a snow tire referred to as a winter tire and is widely used in North America and Europe. For the all-season tire, since excellent control performance and braking and driving performance on a snow-covered road surface (on-snow performance) are demanded, a number of sipes and lug grooves are provided in addition to the circumferential main grooves for the purpose of increasing edge components.

For example, there has been known a pneumatic tire that ensures on-snow performance and improves uneven wear resistance at a central portion in a tread width direction (see Japan Unexamined Patent Publication No. 2013-244907).

Such a pneumatic tire includes a central circumferential main groove formed in a center portion in the tire width direction of the tread and extending in the tire circumferential direction; an outer circumferential main groove that is formed further on an outer side in the tire width direction than the central circumferential main groove in the tread and formed adjacent to the central circumferential main groove, and that extends in the tire circumferential direction; lateral main grooves that are formed in the tread, extend in a direction intersecting the tire circumferential direction, communicate with the central circumferential main groove and the outer circumferential main groove, respectively, and have a groove depth with respect to the tread surface that is deeper than the groove depth of the central circumferential main groove and shallower than the groove depth of the outer circumferential main groove; and a central block defined by the central circumferential main groove, the outer circumferential main groove, and the lateral main grooves. Further, sipes are provided in a groove bottom of the center circumferential main groove.

In the pneumatic tire, on-snow performance can be ensured with an edge of the center block formed with the lateral main groove. Further, the lateral main groove communicates with the center circumferential main groove and the outer circumferential main groove, the groove depth of the lateral main groove is set to be shallower than the groove depth of the outer circumferential main groove, and the groove depth of the center circumferential main groove is set to be shallower than that of the lateral main groove. Thus, rigidity of the center block is ensured, and excessive deformation of the center block is suppressed during loaded rolling of the tire. With this, heel-and-toe wear of the center block can be suppressed. As a result, on-snow performance can be ensured, and uneven wear resistance at the central portion in the tread lateral direction can be improved.

The pneumatic tire described above has excellent uneven wear resistance while ensuring on-snow performance, but when such a tread pattern was applied to an all-season tire for a passenger vehicle, the pneumatic tire did not necessarily exhibit the noise performance suitable for passenger vehicles.

SUMMARY

The present technology provides a tire capable of improving noise performance while maintaining at least on-snow performance using a tread pattern that is different from the tread pattern described above.

An aspect of the present disclosure is a tire having a tread pattern.

The tread pattern includes: a first inner circumferential main groove and a second inner circumferential main groove provided on a first side and a second side, respectively, in a tire width direction about a tire equator line so as to circumnavigate in a tire circumferential direction and sandwich the tire equator line; a first outer circumferential main groove and a second outer circumferential main groove provided on an outer side in the tire width direction of the first inner circumferential main groove and the second inner circumferential main groove, respectively, so as to circumnavigate in the tire circumferential direction; a center land portion provided between the first inner circumferential main groove and the second inner circumferential main groove; and a first intermediate land portion and a second intermediate land portion provided between the first inner circumferential main groove and the first outer circumferential main groove and between the second inner circumferential main groove and the second outer circumferential main groove, respectively.

A region of the center land portion is provided with no grooves but with a plurality of first sipes arranged at intervals in the tire circumferential direction and including an opening end open to the first and second inner circumferential main grooves and with one or a plurality of second sipes arranged in each region in the tire circumferential direction between adjacent first sipes adjacent to each other in the tire circumferential direction among the first sipes, the second sipe having a narrower sipe width than the first sipe and including an opening end open to the first and second inner circumferential main grooves, a region of at least one of the first and second intermediate land portions is provided with a plurality of intermediate lug grooves arranged at intervals in the tire circumferential direction and including an opening end open to at least one of the first and second outer circumferential main grooves and the first and second inner circumferential main grooves, the intermediate lug groove includes one attention intermediate lug groove, an opening end of which is located within a range on a tire circumference along the tire circumferential direction between the opening ends of the adjacent first sipes at any position on the tire circumference, and with respect to the attention intermediate lug groove among the plurality of intermediate lug grooves, a distance along the tire circumferential direction between the opening ends of the intermediate lug groove and the attention intermediate lug groove adjacent to each other in the tire circumferential direction is equal to a distance along the tire circumferential direction between the opening ends of the adjacent first sipes.

Preferably, the region of the first intermediate land portion is provided with, as the intermediate lug groove, a first intermediate lug groove extending in an inclination direction toward a third side in the tire circumferential direction as advancing from the first outer circumferential main groove toward an inner side in the tire width direction and being closed in the region of the first intermediate land portion, the region of the first intermediate land portion is provided with a third sipe extending in the inclination direction from a closed end of the first intermediate lug groove toward the first inner circumferential main groove and open to the first inner circumferential main groove, and a chamfer is provided in one of facing sipe wall surfaces of the third sipe along an extension direction of the third sipe.

Preferably, the chamfer of the third sipe is provided in a sipe wall surface on a fourth side opposite to the third side among the two facing sipe wall surfaces of the third sipe.

Preferably, the region of the second intermediate land portion is provided with, as the intermediate lug groove, a second intermediate lug groove open to the second inner circumferential main groove and the second outer circumferential main groove, and the second intermediate lug groove includes a shallow groove portion having a shallower groove depth than other portions, and the shallow groove portion is on the second side with respect to a deep groove portion having a deeper groove depth than the shallow groove portion so as to include an opening end open to the second outer circumferential main groove.

Preferably, the second intermediate lug groove includes: a pair of inclined groove portions that approach each other as advancing from the opening ends each open to the second inner circumferential main groove and the second outer circumferential main groove toward one side in the tire circumferential direction; and a groove turning portion that connects ends of the pair of inclined groove portions and is bent so as to project toward the one side in the tire circumferential direction, a length of an inclined groove portion on the second side among the pair of inclined groove portions is longer than a length of the inclined groove portion on the first side, and the shallow groove portion is provided within a range of the inclined groove portion on the second side among the pair of inclined groove portions.

Preferably, a first lateral land portion and a second lateral land portion that continue to a ground contact edge in the tire width direction are provided on outer sides in the tire width direction of the first and second outer circumferential main grooves, respectively, a region of the first lateral land portion is provided with a first lateral lug groove that extends from the outer side in the tire width direction toward the first outer circumferential main groove and is open to the first outer circumferential main groove, and a region of the second lateral land portion is provided with a second lateral lug groove that extends from the outer side in the tire width direction toward the second outer circumferential main groove and is closed without opening to the second outer circumferential main groove, the second lateral lug groove having a wider groove width than a groove width of the first lateral lug groove, and a fourth sipe that extends from a closed end of the second lateral lug groove and is open to the second outer circumferential main groove.

Preferably, each of the regions of the first and second lateral land portions is provided with a fifth sipe that extends from the outer side in the tire width direction toward the inner side in the tire width direction in parallel with the first or second lateral lug groove and includes an opening end open to the first or second outer circumferential main groove, the fifth sipe being different from the fourth sipe, the fifth sipe includes a shallow sipe portion having a shallower sipe depth than other portions, and the shallow sipe portion includes the opening end of the fifth sipe, and the shallow sipe portion is provided on a side of the opening end of the fifth sipe with respect to a deep sipe portion having a deeper sipe depth than the shallow sipe portion.

Preferably, the first sipe and the second sipe include a shallow sipe portion having a shallower sipe depth than other portions, and the shallow sipe portion includes the opening end of the first or second sipe, and the shallow sipe portion is provided on both sides of a deep sipe portion having a deeper sipe depth than the shallow sipe portion.

Preferably, the region of the first intermediate land portion is provided with, as the intermediate lug groove, a first intermediate lug groove extending in an inclination direction toward a third side in the tire circumferential direction as advancing from the first outer circumferential main groove toward an inner side in the tire width direction and being closed in the region of the first intermediate land portion, the region of the second intermediate land portion is provided with, as the intermediate lug groove, a second intermediate lug groove open to the second inner circumferential main groove and the second outer circumferential main groove, the regions of the first and second intermediate land portions are provided with a sixth sipe that extends in parallel with the first or second intermediate lug groove and is open to the first outer circumferential main groove and the first inner circumferential main groove or the second outer circumferential main groove and the second inner circumferential main groove, the sixth sipe includes a shallow sipe portion having a shallower sipe depth than other portions, and the shallow sipe portion includes the opening end of the sixth sipe, and the shallow sipe portion is provided on both sides of a deep sipe portion having a deeper sipe depth than the shallow sipe portion.

Preferably, when in a profile cross-section of the tread portion along the tire width direction, an arc in which a tread surface of the center land portion passes through two land edge points connected to groove wall surfaces of the first and second inner circumferential main grooves and each tread surface of the first and second intermediate land portions passes through two land edge points each connected to groove wall surfaces of the first and second inner circumferential main grooves, and a center point of which is located on the tire equator line, is a reference profile line, a profile line formed by the tread surfaces of the center land portion, the first intermediate land portion, and the second intermediate land portion is a bulging profile line that projects toward an outer side in a tire radial direction with respect to the reference profile line.

Preferably, the tire is designated such that the second side is on a vehicle outer side when the tire is mounted on a vehicle.

According to the above-described tire, it is possible to improve noise performance while maintaining at least on-snow performance.

DETAILED DESCRIPTION

Figure 1:
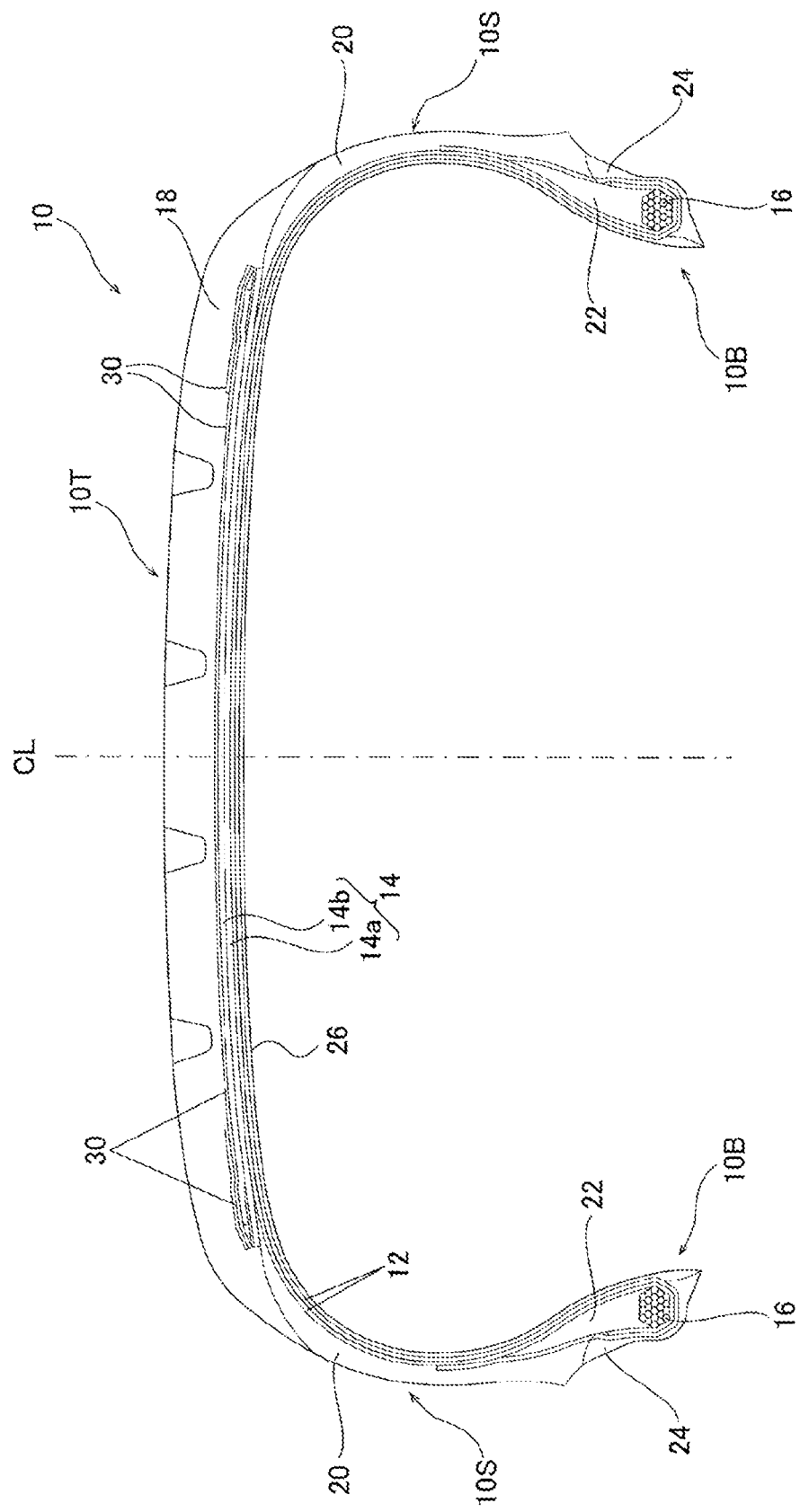
FIG. 1 is a tire cross-sectional view of a pneumatic tire according to an embodiment.

A tire according to embodiments of the present disclosure will be described below in detail with reference to the accompanying drawings.

The tire described below is, for example, applied to an all-season tire for a passenger vehicle, but can also be applied to an all-season tire for a light truck, or an all-season tire for a bus or a truck.

The tire is not limited to pneumatic tires filled with air, and may be a tire filled with an inert gas such as nitrogen or argon, or the tire may be a tire that is not filled with gas. Examples of tires that are not filled with gas include tires configured to be capable of run-flat travel.

In the following description, "tire width direction" is a direction parallel with a rotation axis of the tire. "Outer side in the tire width direction" is a side in the tire width direction away from a tire equator line CL (see FIGS. 1 and 2) that represents the tire equatorial plane, with respect to the position of comparison. The tire width direction includes a first side and a second side, with the tire equator line CL as a boundary. In addition, "inner side in the tire width direction" is a side in the tire width direction toward the tire equator line CL, with respect to the position of comparison. "Tire circumferential direction" is a direction the tire rotates with the rotation axis of the tire as the center of rotation. The tire circumferential direction includes a third side and a fourth side that differ in the direction from each other. "Tire radial direction" is a direction orthogonal to the rotation axis of a tire. "Outer side in the tire radial direction" is a side away from the rotation axis along the tire radial direction, with respect to the position of comparison. "Inner side in the tire radial direction" is a side toward the rotation axis along the tire radial direction, with respect to the position of comparison.

In the following description, a ground contact edge in the tire width direction of a tire is an edge of a region in which the tread surface of a tread portion of the tire contacts a dry horizontal surface, the edge being located farthest from the tire equator line CL in the tire width direction, in a case where the tire is mounted on a regular rim, inflated to the regular internal pressure, and loaded with 70% of the regular load. Here, "regular rim" refers to a "standard rim" defined by JATMA (The Japan Automobile Tyre Manufacturers Association, Inc.), a "design rim" defined by TRA (The Tire and Rim Association, Inc.), or a "measuring rim" defined by ETRTO (The European Tire and Rim Technical Organization), which are standards to which tires conform, for example. "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO, which are standards to which tires conform, for example. "Regular load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO, which are standards to which tires conform, for example.

In the following description, pneumatic tires filled with air are described as an example.

Tire Structure

FIG. 1 is a tire cross-sectional view of a pneumatic tire 10 (hereinafter referred to simply as "tire") according to the embodiment. The tire 10 includes a tread portion 10T including a tread pattern, a pair of bead portions 10B, and a pair of side portions 10S provided in both sides of the tread portion 10T and connecting the pair of bead portions 10B with the tread portion 10T.

The tire 10 includes a carcass ply layer 12, a belt layer 14, and bead cores 16 as framework members or layers of framework members and mainly includes a tread rubber member 18, side rubber members 20, bead filler rubber members 22, rim cushion rubber members 24, and an innerliner rubber member 26 around the framework members.

The carcass ply layer 12 is composed of a carcass ply member that is made of organic fibers coated with rubber and that is wound between a pair of the annular bead cores 16 and formed into a toroidal shape. The carcass ply member is wound around the bead cores 16 and extends to the outer side in the tire radial direction. The belt layer 14 is provided on an outer side of the carcass ply layer 12 in the tire radial direction and is composed of two belt members 14a and 14b. The belt layer 14 is a member made of steel cords that are coated with rubber and that are disposed inclined at a predetermined angle of, for example, from 20 to 30 degrees with respect to the tire circumferential direction. A width in the tire width direction of the lower layer belt member 14a is greater than that of the upper layer belt member 14b. The steel cords of the two belt members 14a and 14b are inclined in opposite directions with respect to the tire equatorial plane CL. Accordingly, the belt members 14a and 14b are crossing layers serving to suppress expansion of the carcass ply layer 12 due to inflation air pressure.

The tread rubber member 18 is provided on an outer side of the belt layer 14 in the tire radial direction. The side rubber members 20 are connected to both end portions of the tread rubber member 18, and form the side portions 10S. The rim cushion rubber members 24 are respectively provided at ends on inner sides of the side rubber members 20 in the tire radial direction and come into contact with a rim on which the tire 10 is mountable. The bead filler rubber members 22 are provided on an outer side of the bead cores 16 in the tire radial direction, each of the bead filler rubber members 22 being sandwiched between a portion of the carcass ply layer 12 before being wound around the bead core 16 and a portion of the carcass ply layer 12 after being wound around the bead core 16. The innerliner rubber member 26 is provided on the inner surface of the tire 10 facing a tire cavity region that is filled with air and is surrounded by the tire 10 and the rim.

In addition, the tire 10 is provided with two belt cover layers 30 that cover the belt layer 14 from the outer side of the belt layer 14 in the tire radial direction and that are made of organic fibers or steel cords coated with rubber. Also, the tire 10 may include a bead stiffener between the carcass ply layer 12 wound around the bead core 16 and the bead filler rubber member 22.

The tire structure of the present embodiment is as described above. However, the tire structure is not particularly limited and a known tire structure is applicable.

Tread Pattern

Figure 2:
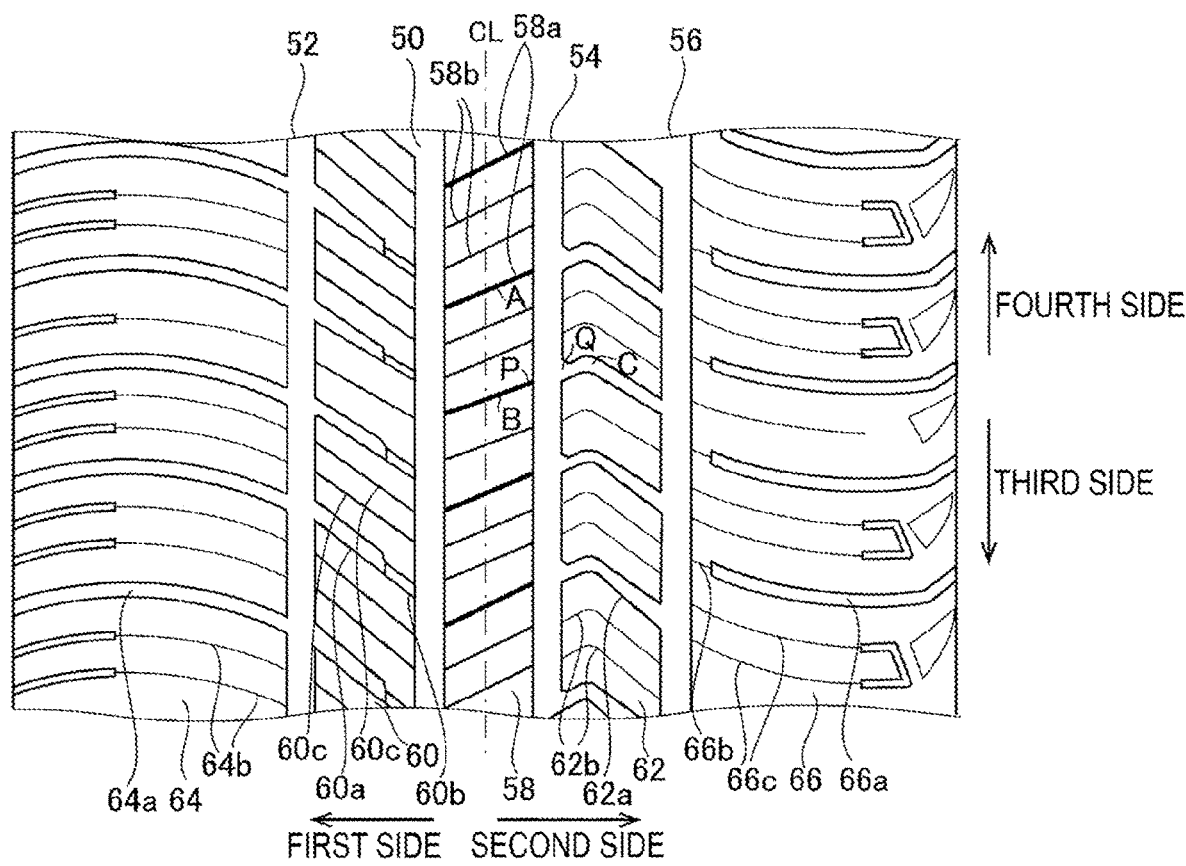
FIG. 2 is a diagram illustrating a tread pattern according to the embodiment.

FIG. 2 is a diagram illustrating an example of a tread pattern according to the embodiment. In FIG. 2, the left side in the drawing in the tire width direction with the tire equatorial line CL as a boundary is referred to as the first side, and the right side in the drawing is referred to as the second side. The lower side in the drawing in the tire circumferential direction is referred to as the third side, and the upper side in the drawing is referred to as the fourth side.

The tread pattern illustrated in FIG. 2 and described below is an asymmetric pattern with respect to the tire equator line CL, but is not necessarily an asymmetrical pattern. For example, the pattern on an outer side of a first inner circumferential main groove 50 on the first side may be replaced with a pattern obtained by rotating a pattern on an outer side of a second inner circumferential main groove 54 on the second side by 180°. That is, the pattern may be a combination of a first tread pattern and a second tread pattern described below. The first tread pattern is a tread pattern on the right side of the first inner circumferential main groove 50, which will be described later in FIG. 2. The second tread pattern is a pattern obtained by inverting (rotating so that the upper side is on the lower side) a portion of the first tread pattern on the outer side in the tire width direction from the second inner circumferential main groove 54 by 180° on the sheet surface of FIG. 2. The second tread pattern is arranged in a portion on the left side of the first inner circumferential main groove 50. By doing so, a point-symmetrical tread pattern is obtained.

As illustrated in FIG. 2, the tread pattern of the tread portion 10T mainly includes the first inner circumferential main groove 50, a first outer circumferential main groove 52, the second inner circumferential main groove 54, a second outer circumferential main groove 56, a center land portion 58, a first intermediate land portion 60, a second intermediate land portion 62, a first lateral land portion 64, a second lateral land portion 66, a first intermediate lug groove 60a, a second intermediate lug groove 62a, a first lateral lug groove 64a, and a second lateral lug groove 66a.

The first inner circumferential main groove 50 and the second inner circumferential main groove 54 are provided on the first side and the second side in the tire width direction so as to circumnavigate in the tire circumferential direction and sandwich the tire equator line CL therebetween.

The first outer circumferential main groove 52 and the second outer circumferential main groove 56 are provided on the outer side in the tire width direction of the first inner circumferential main groove 50 and the second inner circumferential main groove 54 so as to circumnavigate in the tire circumferential direction.

The center land portion 58 is provided between the first inner circumferential main groove 50 and the second inner circumferential main groove 54.

The first intermediate land portion 60 and the second intermediate land portion 62 are provided between the first inner circumferential main groove 50 and the first outer circumferential main groove 52 and between the second inner circumferential main groove 54 and the second outer circumferential main groove 56, respectively.

The first lateral land portion 64 and the second lateral land portion 66 are provided on outer sides in the tire width direction of the first outer circumferential main groove 52 and the second outer circumferential main groove 56 and continue to the ground contact edge in the tire width direction.

No grooves are provided in the region of the center land portion 58, and instead, a plurality of first sipes 58a and the plurality of second sipes 58b are provided in the region of the center land portion 58.

The first sipes 58a are arranged at intervals in the tire circumferential direction, and include opening ends open to the first inner circumferential main groove 50 and the second inner circumferential main groove 54. The second sipe 58b has a narrower sipe width (distance between facing sipe wall surfaces) than the first sipe. One or two second sipes 58b are arranged in each of the regions along the tire circumferential direction between adjacent first sipes 58a adjacent to each other in the tire circumferential direction among the plurality of first sipes 58a, and the second sipe 58b includes an opening end that is open to the first inner circumferential main groove 50 and the second inner circumferential main groove 56 similarly to the first sipe 58a.

The first sipe 58a preferably has, for example, a sipe width of 110% to 400% of the sipe width of the second sipe 58b. The sipe width of the second sipe 58b is, for example, 0.4 to 0.8 mm, and the sipe width of the first sipe 58a is, for example, 1.0 to 1.4 mm.

As described above, no groove or sipe other than the first sipe 58a and the second sipe 58b is provided in the region of the center land portion 58.

In the example illustrated in FIG. 2, the first sipe 58a and the second sipe 58b have a shape that is linearly inclined toward the fourth side in the tire circumferential direction as advancing from the first side in the tire width direction toward the second side. However, the shape of the first sipe 58a and the second sipe 58b is not limited to a shape that is linearly inclined in one direction as long as the first sipe 58a and the second sipe 58b are provided so as to extend in parallel with each other. However, in order to ensure the on-snow performance, it is preferable that the first sipe 58a and the second sipe 58b are inclined in the tire width direction and the tire circumferential direction. At this time, the inclination angles of the first sipe 58a and the second sipe 58b with respect to the tire width direction are preferably 55 to 80°. The fact that the first sipe 58a and the second sipe 58b extend in parallel with each other means that the difference between the inclination angles of the two sipes in the tire width direction is within 12° at an identical position in the tire width direction. The parallelism described below also means that the difference between the inclination angles of the two sipes in the tire width direction is within 12° at an identical position in the tire width direction.

The first intermediate lug groove 60a is provided in the region of the first intermediate land portion 60, extends in an inclination direction toward the third side in the tire circumferential direction as it advances toward the inner side in the tire width direction from the first outer circumferential main groove 52, and is closed in the region of the first intermediate land portion 60. The first intermediate lug groove 60a is preferably inclined in the tire width direction and the tire circumferential direction in order to ensure the on-snow performance. At this time, the inclination angle of the first intermediate lug groove 60a is preferably 45 to 70°.

The region of the first intermediate land portion 60 is provided with a third sipe 60b that extends from the closed end of the first intermediate lug groove 60a toward the first inner circumferential main groove 50 in an identical inclination direction to the first intermediate lug groove 60a and that is open to the first inner circumferential main groove 50.

One of the facing sipe wall surfaces of the third sipe 60b is chamfered along the extension direction of the third sipe 60b. Therefore, the third sipe 60b has a wide sipe width in FIG. 2.

Figures 3A, 3B:
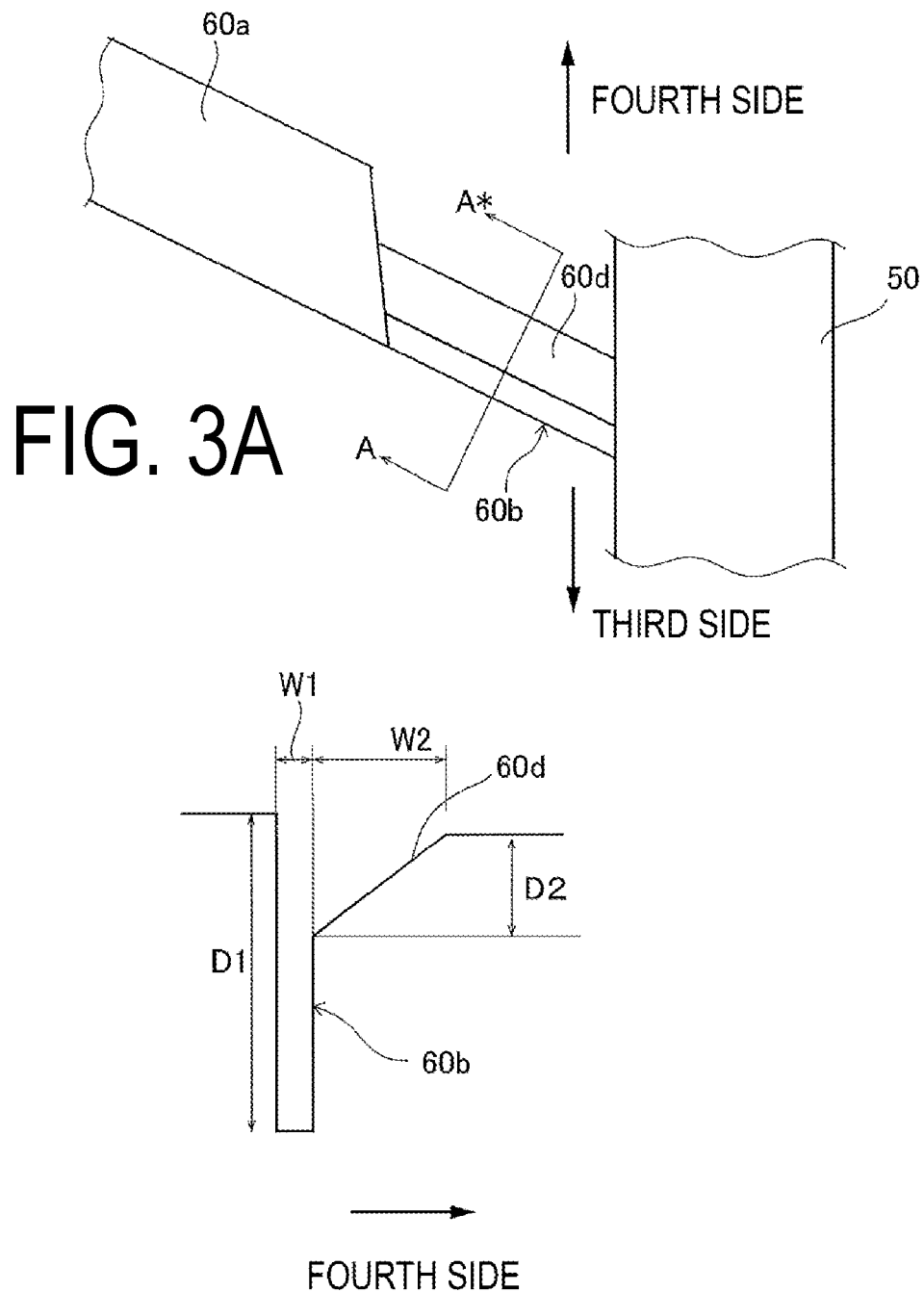
FIGS. 3A and 3B are diagrams illustrating a chamfer of a third sipe in the tread pattern according to the embodiment.

FIGS. 3A and 3B are diagrams illustrating a chamfer of the third sipe 60b. FIG. 3B is a cross-sectional view taken along the line A-A* in FIG. 3A. In the drawing, a chamfered surface 60d is provided on the fourth side but not on the third side. By providing the chamfered surface 60d on the fourth side in this way, since a sharpened portion formed by an edge where the first intermediate land portion 60 is in contact with the first inner circumferential main groove 50 and an edge located on the fourth side of the third sipe 60*b* is eliminated, the decrease in block rigidity can be suppressed. In the sharpened portion, since the block rigidity is locally reduced and deformation is likely to occur, the tire becomes slippery with respect to the road surface. This slippage causes slipping noise and deteriorates noise performance. Therefore, it is preferable to provide the chamfered surface 60*d* on the fourth side. That is, by providing the chamfered surface 60*d* on the fourth side, it is possible to suppress the deformation of a portion of the first intermediate land portion 60 in the vicinity of the opening end of the third sipe 60*b* until it comes into contact with the road surface and is kicked out. Therefore, it is possible to suppress slippage on the road surface due to deformation. Therefore, it is possible to suppress slippage that causes slipping noise and improve noise performance. Providing chamfered surfaces on both sides of the third side and the fourth side is not preferable because the chamfered surfaces on both sides increase the sipe cross-section, which makes it easier to function as a flow path for air flowing in the ground contact surface and deteriorates noise performance.

A distance D2 (see FIG. 3B) from the starting position of the chamfered surface 60*d* in a sipe depth direction to the tread surface is preferably 20% to 50% of a sipe depth D1 (see FIG. 3B) from the perspective of ensuring the area of the ground contact surface while suppressing the decrease in block rigidity.

A chamfer width W2 (see FIG. 3B) along the tread surface of the chamfered surface 60*d* is preferably 180% to 360% of a sipe width W1 (the distance (see FIG. 3B) between the sipe wall surfaces of the portion where the sipe wall surfaces face each other in parallel) of a non-chamfered portion, from the perspective of ensuring the area of the ground contact surface while suppressing the decrease in block rigidity.

A sipe 60*c* (sixth sipe) is provided in the region of the first intermediate land portion 60. The sipe 60*c* extends in parallel with the first intermediate lug groove 60*a* and is open to the first outer circumferential main groove 52 and the first inner circumferential main groove 50. As illustrated in FIG. 2, one or two sipes 60*c* are provided between two first intermediate lug grooves 60*a* adjacent to each other in the tire circumferential direction.

The second intermediate lug groove 62*a* is provided in the region of the second intermediate land portion 62, and is open to the second inner circumferential main groove 54 and the second outer circumferential main groove 56. The second intermediate lug groove 62*a* includes a portion having a shallower groove depth than the other portions, and the shallow groove portion includes an opening end open to the second outer circumferential main groove 56. This shallow groove portion is on the second side with respect to a deep groove portion as compared with the groove depth of the shallow groove portion, that is, on the side of the second outer circumferential main groove 56.

Figure 4:
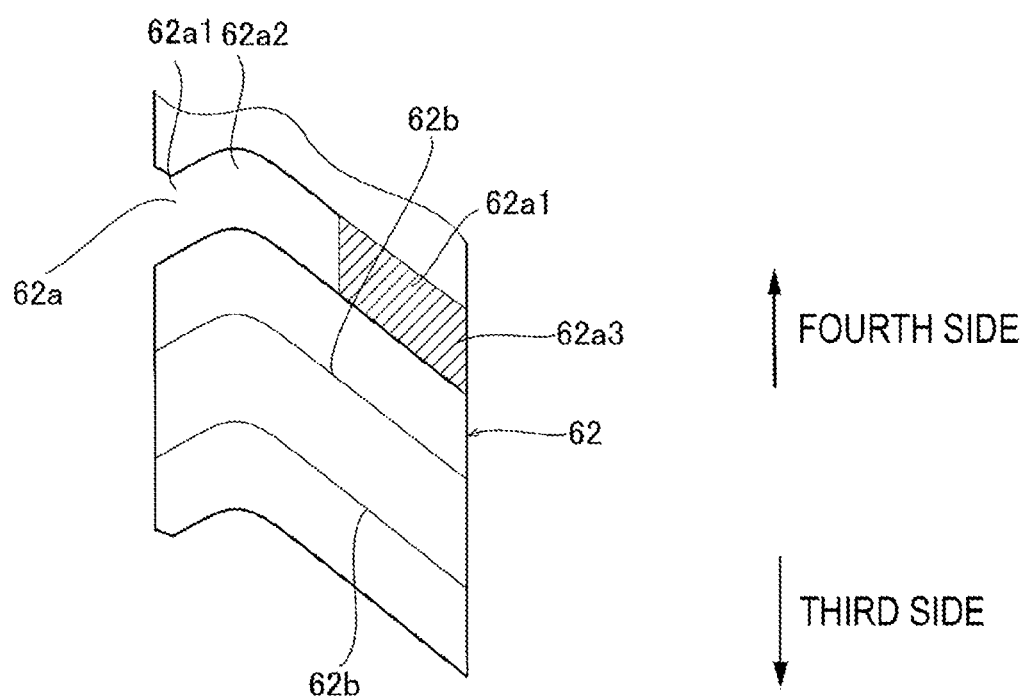
FIG. 4 is an enlarged view of a second intermediate lug groove and a second intermediate land portion of the tread pattern illustrated in FIG. 2.

FIG. 4 is an enlarged view of the second intermediate lug groove 62*a* and the second intermediate land portion 62 illustrated in FIG. 2.

In the example illustrated in FIG. 4, the second intermediate lug groove 62*a* includes: an inclined groove portion 62*a*1 having one end open to the second inner circumferential main groove 54 and inclined so as to advance toward the fourth side as it advances toward the second side; an inclined groove portion 62*a*1 having one end open to the second outer circumferential main groove 56 and inclined so as to advance toward the fourth side as it advances toward the first side; and a groove turning portion 62*a*2 arranged to connect the other ends of a pair of the inclined groove portions 62*a*1. That is, the second intermediate lug groove 62*a* includes: the pair of inclined groove portions 62*a*1 approaching each other as they advance toward one side (specifically the fourth side) in the tire circumferential direction from the opening ends each open to the second inner circumferential main groove 54 and the second outer circumferential main groove 56; and the groove turning portion 62*a*2 connecting the ends of the pair of inclined groove portions 62*a*1 and bent so as to project toward one side (the fourth side) in the tire circumferential direction.

That is, the second intermediate lug groove 62*a* is a peak-like lug groove. By making the second intermediate lug groove 62*a* in a peak-like shape, the groove area can be increased without lowering the block rigidity of the second intermediate land portion 62. The length of the inclined groove portion 62*a*1 on the second side among the pair of inclined groove portions 62*a*1 is longer than the length of the inclined groove portion 62*a*1 on the first side.

As illustrated in FIG. 4, a shallow groove portion 62*a*3 (the portion illustrated by diagonal lines in FIG. 4) is preferably provided in the inclined groove portion 62*a*1 having an opening end open to the second outer circumferential main groove 56 and located on the second side among the inclined groove portions 62*a*1.

By providing the shallow groove portion 62*a*3 in the inclined groove portion 62*a*1 having an opening end open to the second outer circumferential main groove 56 and located on the second side, it is possible to suppress a local decrease in the block rigidity of a portion of the second intermediate land portion 62 around the opening end of the second intermediate lug groove 62*a* open to the second outer circumferential main groove 56 in the tire width direction. This portion is easily deformed when there is a local decrease in block rigidity, and as a result, the tire becomes slippery with respect to the road surface. This slippage causes slipping noise and deteriorates noise performance. Therefore, it is preferable to provide the shallow groove portion 62*a*3 on the second side. On the outer side in the tire width direction, since the land portion is easily deformed due to the wiping action or the like when the tire contacts the ground, it is preferable to provide the shallow groove portion 62*a*3 which is not easily deformed on the second side. That is, by providing the shallow groove portion 62*a*3 on the second side, since deformation until it makes contact with the road surface and is kicked out can be suppressed, slippage on the road surface due to deformation can be suppressed. Therefore, it is possible to suppress slippage that causes slipping noise and improve noise performance.

The maximum groove depth of the shallow groove portion 62*a*3 is preferably 60% to 75% of the maximum groove depth of the deep groove portion, from the perspective of suppressing a decrease in the block rigidity while exhibiting the effect of on-snow performance in the second intermediate lug groove 62*a*.

The region of the second intermediate land portion 62 is provided with a sipe 62*b* (sixth sipe) extending in parallel with the second intermediate lug groove 62*a* and open to the second inner circumferential main groove 54 and the second outer circumferential main groove 56, respectively. One or two sipes 62*b* are provided between the second intermediate lug grooves 62*a* adjacent to each other in the tire circumferential direction.

The region of the first lateral land portion 64 is provided with the first lateral lug groove 64*a* extending from the outer side in the tire width direction toward the first outer circumferential main groove 52 and open to the first outer circumferential main groove 52. A plurality of the first lateral lug grooves 64a are provided at intervals in the tire circumferential direction. Each of the first lateral lug grooves 64a has a curved shape that gently curves toward the fourth side in a convex shape.

A sipe 64b (fifth sipe) extending in parallel with the first lateral lug groove 64a from the outer side in the tire width direction toward the first outer circumferential main groove 52 and open to the first outer circumferential main groove 52 is provided between two first lateral lug grooves 64a adjacent to each other in the tire circumferential direction.

The region of the second lateral land portion 66 is provided with the second lateral lug groove 66a extending from the outer side in the tire width direction toward the second outer circumferential main groove 56 and closed without opening to the second outer circumferential main groove 56. The groove width of the second lateral lug groove 66a is wider than the groove width of the first lateral lug groove 64a. The maximum groove depths of the first lateral lug groove 64a and the second lateral lug groove 66a are identical. A plurality of the second lateral lug grooves 66a are provided at intervals in the tire circumferential direction. Each of the second lateral lug grooves 66a has a curved shape that gently curves toward the third side in a convex shape. The region of the second lateral land portion 66 is further provided with a sipe 66b (fourth sipe) extending from the closed end of the second lateral lug groove 66a and open to the second outer circumferential main groove 56.

A sipe 66c (fifth sipe) extending in parallel with the second lateral lug groove 66a from the outer side in the tire width direction toward the second outer circumferential main groove 56 and open to the second outer circumferential main groove 56 is provided between two second lateral lug grooves 66a adjacent to each other in the tire circumferential direction.

The groove depth and groove width of the first inner circumferential main groove 50, the first outer circumferential main groove 52, the second inner circumferential main groove 54, and the second outer circumferential main groove 56 differ depending on the tire size. In the case of a tire for a passenger vehicle, the groove depth is, for example, 7.0 mm to 9.0 mm, and the groove width is, for example, 7.0 to 10.0 mm.

The maximum groove depth and groove width of the first intermediate lug groove 60a and the second intermediate lug groove 62a differ depending on the tire size. In the case of a tire for a passenger vehicle, the maximum groove depth is, for example, 4.5 mm to 7.0 mm, and the groove width is, for example, 2.5 to 5.5 mm.

The maximum groove depth and groove width of the first lateral lug groove 64a and the second lateral lug groove 66a differ depending on the tire size. In the case of a tire for a passenger vehicle, the maximum groove depth is, for example, 4.5 mm to 7.0 mm, and the groove width is, for example, 1.8 to 4.0 mm.

The sipe depth and sipe width of the first sipe 58a differ depending on the tire size. In the case of a tire for a passenger vehicle, the sipe depth is, for example, 4 mm to 7 mm, and the sipe width is, for example, 1.0 mm to 1.4 mm.

The sipe depth and sipe width of the second sipe 58b differ depending on the tire size. In the case of a tire for a passenger vehicle, the sipe depth is, for example, 4 mm to 7 mm, and the sipe width is, for example, 0.4 mm to 0.8 mm.

The sipe depth and sipe width (distance between sipe wall surfaces where the facing sipe wall surfaces are parallel) of the third sipe 60b differ depending on the tire size. In the case of a tire for a passenger vehicle, the sipe depth is, for example, 2.5 mm to 5.0 mm, and the sipe width is, for example, 0.4 mm to 1.2 mm.

The sipe depth and sipe width of the sipe 66b (fourth sipe) differ depending on the tire size. In the case of a tire for a passenger vehicle, the sipe depth is, for example, 2.5 mm to 5.0 mm, and the sipe width is, for example, 0.4 mm to 1.2 mm.

The sipe depth and sipe width of the sipe 64b and 66c (fifth sipe) differ depending on the tire size. In the case of a tire for a passenger vehicle, the sipe depth is, for example, 4 mm to 7 mm, and the sipe width is, for example, 0.4 mm to 1.2 mm.

The sipe depth and sipe width of the sipe 60c and 62b (sixth sipe) differ depending on the tire size. In the case of a tire for a passenger vehicle, the sipe depth is, for example, 4 mm to 7 mm, and the sipe width is, for example, 0.4 mm to 1.2 mm.

In such a tread pattern, the opening end of either one or both of the first intermediate lug groove 60a and the second intermediate lug groove 62a is located in a range along the tire circumferential direction between adjacent first sipes 58a adjacent to each other in the tire circumferential direction. A lug groove having an opening end at such a position is referred to as a corresponding intermediate lug groove.

In the example illustrated in FIG. 2, signs "A" and "B" are assigned to two adjacent first sipes 58a adjacent to each other, respectively. An opening end Q of the second intermediate lug groove 62a (attention intermediate lug groove) indicated by sign "C" is located in the range in the tire circumferential direction from the adjacent first sipe "A" to the adjacent first sipe "B". This relationship is satisfied at any adjacent first sipe 58a on the tire circumference. At this time, at any position on the tire circumference, the distance along the tire circumferential direction from the opening end of the adjacent first sipe "A" to the opening end of the adjacent second sipe "B" is equal to the distance along the tire circumferential direction between the opening end Q of the corresponding intermediate lug groove 62a (attention intermediate lug groove) indicated by sign "C" and the opening end of the second intermediate lug groove 62a adjacent in the tire circumferential direction to the corresponding intermediate lug groove 62a indicated by sign "C". This is established for both second intermediate lug grooves 62a adjacent on both sides in the tire circumferential direction of the corresponding second intermediate lug groove 62a indicated by sign C.

The range along the tire circumferential direction between the opening end of the first sipe "A" and the opening end of the first sipe "B" adjacent to each other and the range along the tire circumferential direction between the opening ends of the second intermediate lug grooves 62a adjacent to each other may not necessarily coincide with each other but may deviate from each other. That is, in the tire circumferential direction, the position of the opening end of the first sipe "A" or the opening end of the first sipe "B" adjacent to each other may coincide with the opening end of the second intermediate lug groove 62a. However, the opening end of the second intermediate lug groove may be in the range from the opening end of the first sipe "A" to the opening end of the adjacent first sipe "B" adjacent to each other.

In the example illustrated in FIG. 2, the corresponding intermediate lug groove is the second intermediate lug groove 62a, but the corresponding intermediate lug groove may be the first intermediate lug groove 60a. In this case, the opening end is the end open to the first outer circumferential main groove. Here, the term "equal distance" includes those in which the two distances to be compared are completely equal to each other and the difference between the two distances to be compared is within an allowable range. Being within the allowable range means that the difference between the two distances to be compared is, for example, 20% or less, preferably 15% or less, with respect to the smaller of the two distances to be compared.

As illustrated in FIG. 2, the center land portion 58 is provided with the first sipe 58a and the second sipe 58b. However, since the center land portion 58 is not provided with any grooves such as lug grooves, the pattern noise generated from the center land portion 58 is reduced. However, the snow column shear force is eliminated, and the braking and driving performance and the control performance on snow-covered road surfaces, that is, on-snow performance, are likely to deteriorate. However, by providing the first sipe 58a and the second sipe 58b in the center land portion 58 to increase the sipe density, the edge effect in the center land portion 58 can be enhanced, and the on-snow performance equivalent to that when lug grooves are present can be maintained. Due to this, the noise performance can be improved while maintaining the on-snow performance.

The region of the first intermediate land portion 60 is provided with the first intermediate lug groove 60a that closes within the region of the first intermediate land portion 60, and the third sipe 60b extends in an identical inclination direction to the inclination direction of the first intermediate lug groove 60a from the closed end of the first intermediate lug groove 60a toward the first inner circumferential main groove 50 and is open to the first inner circumferential main groove 50. One of the facing sipe wall surfaces of the third sipe 60b is chamfered. Therefore, since the air in the first intermediate lug groove 60a compressed by the deformation of the first intermediate lug groove 60a in the ground contact surface becomes difficult to flow into the first inner circumferential main groove 50, and since the sound generated due to the flow is reduced, the noise performance can be improved.

Since the sipe wall surface of the third sipe 60b is chamfered, the sipe cross-section is widened by the amount of chamfering. Therefore, while running on snow-covered road surfaces, the snow column shear force is exerted in a portion where the third sipe 60b is chamfered and the sipe cross-section is widened, which contributes to the improvement in the on-snow performance.

At this time, as described above, the chamfer in the third sipe 60b is preferably provided on the sipe wall surface on the fourth side opposite to the third side among the two facing sipe wall surfaces of the third sipe 60b. By providing the chamfer on the sipe wall surface on the fourth side, as illustrated in FIG. 3A, since a sharpened portion formed by an edge where the first intermediate land portion 60 is in contact with the first inner circumferential main groove 50 and an edge located on the fourth side of the third sipe 60b is eliminated, a local decrease in block rigidity can be suppressed. The sharpened portion is likely to be deformed due to the local decrease in block rigidity, and as a result, the tire becomes slippery. This slip causes slipping noise and deteriorates noise performance. Therefore, it is preferable to provide the chamfered surface 60d on the fourth side so that the sharpened portion is reduced. That is, by providing the chamfered surface 60d on the fourth side, since it is possible to suppress the deformation until it comes into contact with the road surface and is kicked out, it is possible to suppress slippage on the road surface due to deformation. Therefore, it is possible to suppress slippage that causes slipping noise and improve noise performance.

The width center position in the sipe width direction of the portion where the sipe wall surfaces of the third sipe 60b are parallel is preferably provided to be offset to the groove wall surface side on the third side of the first intermediate lug groove 60a.

The second intermediate lug groove 62a provided in the region of the second intermediate land portion 62 is open to the second inner circumferential main groove 54 and the second outer circumferential main groove 56, the second intermediate lug groove 62a includes the portion 62a3 (see FIG. 4) whose groove depth is shallower than that of the other portions, and the shallow groove portion 62a3 includes an opening end open to the second outer circumferential main groove 56. Moreover, the shallow groove portion 62a3 is on the second side (the right side on the sheet surface in FIG. 2) with respect to the deep groove portion as compared with the groove depth of the shallow groove portion 62a3. Therefore, the block rigidity of the second intermediate land portion 62 around the second outer circumferential main groove 56 can be locally increased. Due to this, in the portion of the second intermediate land portion 62 around the second outer circumferential main groove 56, since deformation until it comes into contact with the road surface and is kicked out can be suppressed, it is possible to suppress slippage on the road surface due to deformation. Therefore, it is possible to suppress slippage that causes slipping noise and reduce improve performance. That is, by providing the shallow groove portion 62a3 on the second side (the right side on the sheet surface in FIG. 2) with respect to the deep groove portion, since it is possible to suppress the deformation until it comes into contact with the road surface and is kicked out, it is possible to suppress slippage on the road surface due to deformation. Therefore, it is possible to suppress slippage that causes slipping noise and improve noise performance.

Since the block rigidity of the second intermediate land portion 62 around the shallow groove portion of the second outer circumferential main groove 56 is locally increased, uneven wear of the second intermediate land portion 62 is unlikely to occur in the tire 10 in the intermediate stage of wear in which land portions are worn due to running. Therefore, noise that is likely to occur due to uneven wear can be suppressed.

The second intermediate lug groove 62a includes the pair of inclined groove portions 62a1 and the groove turning portion 62a2, and the shallow groove portion 62a3 is provided within the range of the inclined groove portion 62a1 on the second side, the inclined groove portion 62a1 having the longer length among the inclined groove portions 62a1, and is not provided in the groove turning portion 62a2 and the inclined groove portion 62a1 on the first side. By providing the shallow groove portion 62a3 in the inclined groove portion 62a1 on the second side, it is possible to effectively locally increase the block rigidity of the second intermediate land portion 62 around the second outer circumferential main groove 56.

Since the ground contact pressure of the second intermediate land portion 62 on the outer side in the tire width direction is higher than that on the inner side, and the length of the inclined groove portion 62a1 on the outer side (the second side) in the tire width direction is longer than the length of the inclined groove portion 62a1 on the inner side in the tire width direction, the snow column shear force can be exerted more effectively.

In the region of the second lateral land portion 66, the second lateral lug groove 66a is closed without opening to the second outer circumferential main groove 56, and the sipe 66b (the fourth sipe) is provided so as to be open to the second outer circumferential main groove 56 from the closed end of the second lateral lug groove 66a. Therefore, the block rigidity of the second lateral land portion 66 around the second outer circumferential main groove 56 can be efficiently increased. Therefore, it is possible to suppress a decrease in the block rigidity of the land portion around the second outer circumferential main groove 56 in which the block rigidity in the second lateral land portion 66 is likely to decrease. Therefore, it is possible to suppress slippage that is likely to occur due to the local decrease in the block rigidity and that causes slipping noise, and improve noise performance. That is, by closing the second lateral lug groove 66a, and opening the sipe 66b (fourth sipe) from the closed end of the second lateral lug groove 66a to the second outer circumferential main groove 56, deformation in the portion of the second lateral land portion 66 around the second outer circumferential main groove 56 until it comes into contact with the road surface and is kicked out can be suppressed. Therefore, it is possible to suppress slippage on the road surface due to deformation. Therefore, it is possible to suppress slippage that causes slipping noise and improve noise performance.

Since the groove width of the second lateral lug groove 66a is wider than the groove width of the first lateral lug groove 64a so as to compensate for the groove volume of the lug groove that is reduced due to the closing of the second lateral lug groove 66a, the function of the snow column shear force can be exhibited to the same extent as that of the first lateral lug groove 64a.

Figure 5A:
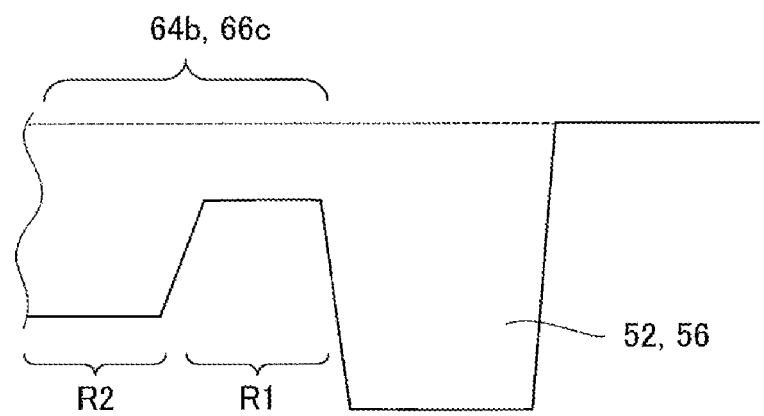
FIGS. 5A and 5B are diagrams illustrating an example of a bottom portion of a sipe used in the tread pattern according to the embodiment.

According to one embodiment, the sipe 64b, 66c (fifth sipe) includes a portion having a shallower sipe depth than the other portions, and the shallow sipe portion includes the opening end of the sipe 64b, 66c (fifth sipe), that is, an opening end that is connected to the first outer circumferential main groove 52 or the second outer circumferential main groove 56. At this time, the shallow sipe portion is preferably provided on a side of the opening end of the sipe 64b, 66c (fifth sipe) with respect to a deep sipe portion as compared with the shallow sipe portion. FIG. 5A is a diagram illustrating an example of the bottom portion of the sipe in one embodiment. As illustrated in FIG. 5A, the sipe 64b, 66c includes a shallow sipe portion R1 and a deep sipe portion R2 with regard to the sipe depth, and the shallow sipe portion R1 preferably includes the opening end of the sipe 64b, 66c (fifth sipe).

Figure 5B:
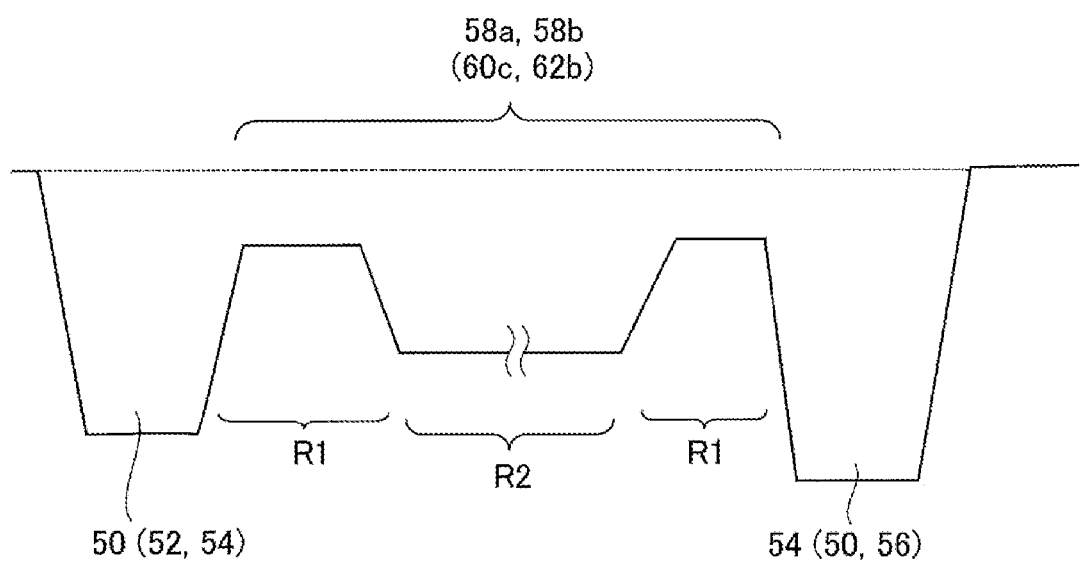

The first sipe 58a and the second sipe 58b include a portion where the sipe depth is shallower than the other portions, and the shallow sipe portion includes the opening end of the first sipe 58a or the second sipe 58b. At this time, according to one embodiment, it is preferable that the shallow sipe portion is provided on both sides of the deep sipe portion as compared with the shallow sipe portion. FIG. 5B is a diagram illustrating another example of the bottom portion of the sipe in one embodiment. As illustrated in FIG. 5B, the first sipe 58a and the second sipe 58b include two shallow sipe portions R1 and one deep sipe portion R2 with regard to the sipe depth, and the shallow sipe portion R1 preferably includes the opening ends on both sides of the first sipe 58a or the second sipe 58b.

The region of the first intermediate land portion 60 is provided with the sipe 60c (sixth sipe) extending in parallel with the first intermediate lug groove 60a and open to the first outer circumferential main groove 52 and the first inner circumferential main groove 50, and the region of the second intermediate land portion 62 is provided with the sipe 62b (sixth sipe) extending in parallel with the second intermediate lug groove 62a and open to the second outer circumferential main groove 56 and the second inner circumferential main groove 54. At this time, as illustrated in FIG. 5B, the sipe 60c and the sipe 62b (sixth sipe) also include two shallow sipe portions R1 having a shallower sipe depth than the other portions, and the shallow sipe portion R1 includes the opening end of the sipe 60c or the sipe 62b, and the shallow sipe portion R1 is preferably provided on both sides of the deep sipe portion R2 as compared with the shallow sipe portion R1.

In this way, by providing the shallow sipe portion R1 in the portion connected to the opening end of the sipe, a local decrease in the block rigidity of the portion of the land portion around the opening end where each sipe is open to the circumferential main groove can be suppressed. Therefore, it is possible to suppress slippage on the road surface due to deformation of this portion. Therefore, it is possible to suppress slippage that causes slipping noise and improve noise performance. That is, by providing the shallow sipe portion R1 in the portion connected to the opening end of the sipe, it is possible to suppress the deformation of this portion until it comes into contact with the road surface and is kicked out. Therefore, it is possible to suppress the slippage on the road surface due to the deformation. Therefore, it is possible to suppress slippage that causes slipping noise and improve noise performance.

Figure 6:
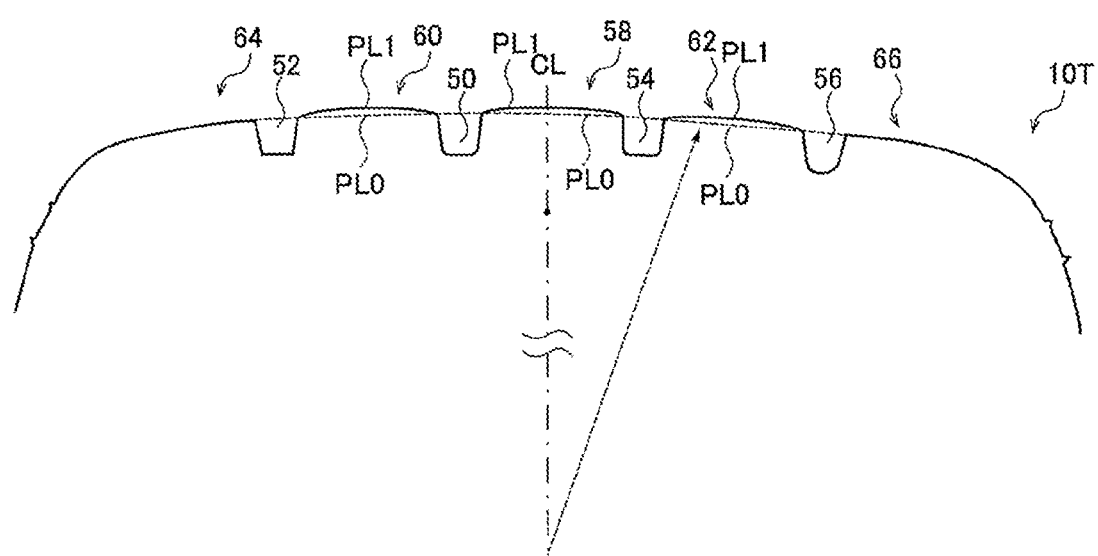
FIG. 6 is a diagram illustrating a bulging profile line used in the tread pattern according to the embodiment.

According to one embodiment, the profile line formed by the tread surfaces of the center land portion 58, the first intermediate land portion 60, and the second intermediate land portion 62 is preferably a bulging profile line that projects toward the outer side in the tire radial direction with respect to a reference profile line illustrated below. FIG. 6 is a diagram illustrating a bulging profile line.

A reference profile line PL0 illustrated in FIG. 6 means an arc line in which in a profile cross-section of the tread portion along the tire width direction, the tread surface of the center land portion 58 passes through two land edge points connected to groove wall surfaces of the first and second inner circumferential main grooves 50 and 54 and each tread surface of the first and second intermediate land portions 60 and 62 passes through two land edge points each connected to groove wall surfaces of the first and second inner circumferential main grooves 50 and 54, and the center point of which is located on the tire equatorial plane CL. The arc line is preferably configured such that the tread surfaces of the first and second intermediate land portions 60 and 62 pass through two land edge points connected to the groove wall surfaces of the first and second outer circumferential main grooves 52 and 56.

In this case, an arc line in which the total separation distance of each of the points from the arc falls within a predetermined range may be the reference profile line PL0, and an arc line in which the total distance from each of the land edge points to the arc line is the smallest is preferably the reference profile line PL0.

A bulging profile line PL1 projects to the outer side in the tire radial direction with respect to the reference profile line PL0 from the land edge points of the center land portion 58, the first intermediate land portion 60, and the second intermediate land portion 62.

By providing the profile line PL1 in this way, the ground contact pressure at the central portion of each of the center land portion 58, the first intermediate land portion 60, and the second intermediate land portion 62 can be effectively increased, and the ground contact pressure distribution can be shifted uniformly. Due to this, the edge effect of the sipes provided in the center land portion 58, the first intermediate land portion 60, and the second intermediate land portion 62 can be efficiently enhanced. Therefore, the on-snow performance can be improved.

The maximum projection amount of the bulging profile line PL1 with respect to the reference profile line PL0 is preferably 0.1 to 1.0 mm, for example.

According to one embodiment, the tire 10 is preferably designated so that the second side is on a vehicle outer side when the tire 10 is mounted on a vehicle. For this designation, information on a mounting outer side or a mounting inner side is displayed as a side pattern in the side portion 10S by using letters, symbols, signs, or the like. In the case of the tread pattern illustrated in FIG. 2, preferably, the side of the half-tread region at the right of the tire equator line CL illustrated in FIG. 2 is designated to be at the vehicle outer side.

Since the local block rigidity of the land portion around the second circumferential main groove 56 is higher than the land portion around the first circumferential main groove 52 so as to correspond to the vehicle outer side of the tire in which the contribution of the block rigidity is high in the cornering characteristics during traveling of a vehicle, the tire 10 is preferably attached to the vehicle so that the second side is on the vehicle outer side when the tire 10 is mounted on the vehicle.

Experiment

In order to confirm the effect of the tread pattern of the present embodiment, a tire for a passenger vehicle having a size of 235/60R18 was manufactured with the tire structure illustrated in FIG. 1. At this time, tires having various tread patterns changed from the tread pattern illustrated in FIG. 2 as a reference were manufactured. The manufactured tires were assembled on a rim with a rim width of 7.5 J and attached to the four wheels of the vehicle (pneumatic pressure 230 kPa). The vehicle is a 2400 cc-class front-wheel drive sport utility vehicle (SUV).

The tires were evaluated for on-snow performance and noise performance by sensory evaluation of the driver who drives the vehicle. As an evaluation of the on-snow performance, a sensory evaluation was performed when the vehicle was driven in a predetermined driving mode on a predetermined snow-covered road surface course. Further, as an evaluation of noise performance, a sensory evaluation of tire noise was performed at a traveling speed of 40 km/hour to 120 km/hour. The noise performance of a new tire that was not worn and the noise performance of a tire that had been run for 5000 km in an intermediate stage of wear were evaluated.

The evaluation results are expressed as index values as compared with Conventional Example being assigned with 100. The higher the index value, the better the on-snow performance and the better the noise performance (less noise).

In Conventional Example, a lug groove having an identical groove width to the groove depth of the second intermediate lug groove 62a, the lug groove opening to the first and second inner circumferential main grooves 50 and 54, is employed instead of the first sipe 58a illustrated in FIG. 2.

In the column of "distance between opening ends of sipe" in Tables 1 and 2 below, a case where the distance between the opening ends of the first sipe 58a at any position on the tire circumference is equal to the distance along the tire circumferential direction between the opening ends of the corresponding second intermediate lug groove 62a and the second intermediate lug groove 62a adjacent to the corresponding second intermediate lug groove 62a is displayed as "equal", and the other cases are displayed as "not equal".

In the column of "presence/absence and position of shallow groove portion" in Tables 1 and 2 below, "Yes (first side)" in Example 4 means that the shallow groove portion of the second intermediate lug groove 62a is provided within the range of the inclined groove portion 62a1 on the first side from the opening end on the first side open to the second inner circumferential main groove 54.

TABLE 1

|  | Conventional Example | Comparative Example 1 | Comparative Example 2 | Example 1 |
|---|---|---|---|---|
| Presence/absence of first sipe 58a in center land portion | No (Lug groove present) | Yes | No (Sipe width of first sipe 58a is equal to sipe width of second sipe 58b) | Yes |
| Distance between opening ends of sipe | Equal | Not equal | Equal | Equal |
| Presence/absence of chamfer in third sipe 60b | No | No | No | No |
| Presence/absence and position of shallow groove portion | No | No | No | No |
| Is second side vehicle mounting outer side? | Outer side | Outer side | Outer side | Outer side |
| On-snow performance | 100 | 100 | 97 | 100 |
| Noise performance when tire is new | 100 | 103 | 103 | 103 |
| Noise performance in intermediate stage of wear | 100 | 97 | 100 | 100 |

TABLE 2

|  | Example 2 | Example 3 | Example 4 | Example 5 |
|---|---|---|---|---|
| Presence/absence of first sipe 58a in center land portion | Yes | Yes | Yes | Yes |
| Distance between opening ends of sipe | Equal | Equal | Equal | Equal |
| Presence/absence of chamfer in third sipe 60b | Yes | Yes | Yes | Yes |

TABLE 2-continued

|  | Example 2 | Example 3 | Example 4 | Example 5 |
|---|---|---|---|---|
| Presence/absence and position of shallow groove portion | No | Yes (second side) | Yes (first side) | Yes (second side) |
| Is second side vehicle mounting outer side? | Outer side | Outer side | Outer side | Inner side |
| On-snow performance | 103 | 103 | 103 | 100 |
| Noise performance when tire is new | 103 | 105 | 103 | 103 |
| Noise performance in intermediate stage of wear | 100 | 100 | 100 | 100 |

From the comparison of Example 1, Conventional Example, and Comparative Examples 1 and 2 in Table 1, the fact that the first sipe 58a having a wider sipe width than the second sipe 58b is provided in the center land portion 58; and that the distance along the tire circumferential direction between the opening ends of the adjacent first sipes 58a adjacent to each other in the tire circumferential direction, that is, the distance along the tire circumferential direction from the opening end of the adjacent first sipe "A" to the opening end of the adjacent second sipe "B" at any position on the tire circumference being equal to the distance along the tire circumferential direction between the opening end Q of the corresponding second intermediate lug groove 62a indicated by symbol "C" and the opening end of the second intermediate lug groove 62a adjacent in the tire circumferential direction to the corresponding second intermediate lug groove 62a indicated by symbol "C", is established for both second intermediate lug grooves 62a adjacent on both sides in the tire circumferential direction to the corresponding second intermediate lug groove 62a indicated by symbol "C". Due to these, it is possible to improve the noise performance while maintaining at least the on-snow performance.

From Example 1 in Table 1 and Example 2 in Table 2, it can be seen that it is preferable to provide a chamfer on the third sipe 60b, from the perspective of improving the on-snow performance and improving the noise performance.

From Examples 2 to 4 in Table 2, it can be seen that it is preferable to provide a shallow groove portion on the second side, from the perspective of improving the on-snow performance and improving the noise performance.

From Examples 4 and 5 in Table 2, it can be seen that it is preferable to mount the tires so that the second side is the vehicle mounting outer side, from the perspective of improving the noise performance while maintaining at least the on-snow performance.

Although the tire of the present technology has been described in detail above, the present technology is not limited to the above-described embodiments and examples, and various improvements and changes may naturally be made without departing from the gist of the present technology.

The invention claimed is:

1. A tire comprising a tread portion comprising a tread pattern, the tread pattern comprising:

a first inner circumferential main groove and a second inner circumferential main groove provided on a first side and a second side, respectively, in a tire width direction about a tire equator line so as to circumnavigate in a tire circumferential direction and sandwich the tire equator line;

a first outer circumferential main groove and a second outer circumferential main groove provided on an outer side in the tire width direction of the first inner circumferential main groove and the second inner circumferential main groove, respectively, so as to circumnavigate in the tire circumferential direction;

a center land portion provided between the first inner circumferential main groove and the second inner circumferential main groove; and a first intermediate land portion and a second intermediate land portion provided between the first inner circumferential main groove and the first outer circumferential main groove and between the second inner circumferential main groove and the second outer circumferential main groove, respectively, a region of the center land portion being provided with no grooves having a groove width greater than a sipe width but with a plurality of first sipes arranged at intervals in the tire circumferential direction and comprising an opening end open to each of the first and second inner circumferential main grooves and with one or a plurality of second sipes arranged in each region in the tire circumferential direction between adjacent first sipes adjacent to each other in the tire circumferential direction among the first sipes, the second sipe having a narrower sipe width than the first sipe and comprising an opening end open to each of the first and second inner circumferential main grooves, the first and second sipes having the sipe width of 1.4 mm or less, a region of at least one of the first and second intermediate land portions being provided with a plurality of intermediate lug grooves arranged at intervals in the tire circumferential direction and comprising an opening end open to at least one of the first and second outer circumferential main grooves and the first and second inner circumferential main grooves, the intermediate lug grooves comprising one attention intermediate lug groove, an opening end of which is located within a range on a tire circumference along the tire circumferential direction between the opening ends of the adjacent first sipes at any position on the tire circumference, and with respect to the attention intermediate lug groove among the plurality of intermediate lug grooves, a distance along the tire circumferential direction between the opening ends of the intermediate lug grooves and the attention intermediate lug groove adjacent to each other in the tire circumferential direction being equal to a distance along the tire circumferential direction between the opening ends of the adjacent first sipes.

2. The tire according to claim 1, wherein the region of the first intermediate land portion is provided with, as the intermediate lug grooves, a first intermediate lug groove extending in an inclination direction toward a third side in the tire circumferential direction as advancing from an opening to the first outer circumferential main groove toward an inner side in the tire width direction and being closed in the region of the first intermediate land portion without opening to the first inner circumferential main groove, the region of the first intermediate land portion is provided with a third sipe extending in the inclination direction from a closed end of the first intermediate lug groove toward the first inner circumferential main groove and open to the first inner circumferential main groove, and a chamfer is provided in one of two facing sipe wall surfaces of the third sipe along an extension direction of the third sipe.

3. The tire according to claim 2, wherein the chamfer of the third sipe is provided in a sipe wall surface on a fourth side opposite to the third side among the two facing sipe wall surfaces of the third sipe.

4. The tire according to claim 1, wherein the region of the second intermediate land portion is provided with, as the intermediate lug grooves, second intermediate lug grooves open to the second inner circumferential main groove and the second outer circumferential main groove, and the second intermediate lug grooves comprise a shallow groove portion having a shallower groove depth than other portions, and the shallow groove portion is on the second side with respect to a deep groove portion having a deeper groove depth than the shallow groove portion so as to comprise an opening end open to the second outer circumferential main groove.

5. The tire according to claim 4, wherein
the second intermediate lug grooves comprise:
a pair of inclined groove portions that approach each other as advancing from the opening ends each open to the second inner circumferential main groove and the second outer circumferential main groove toward one side in the tire circumferential direction; and
a groove turning portion that connects ends of the pair of inclined groove portions and is bent so as to project toward the one side in the tire circumferential direction,
a length of an inclined groove portion on the second side among the pair of inclined groove portions is longer than a length of the inclined groove portion on the first side, and
the shallow groove portion is provided within a range of the inclined groove portion on the second side among the pair of inclined groove portions.

6. The tire according to claim 1, wherein
a first lateral land portion and a second lateral land portion that continue to a ground contact edge in the tire width direction are provided on outer sides in the tire width direction of the first and second outer circumferential main grooves, respectively,
a region of the first lateral land portion is provided with a first lateral lug groove that extends from the outer side in the tire width direction toward the first outer circumferential main groove and is open to the first outer circumferential main groove, and
a region of the second lateral land portion is provided with a second lateral lug groove that extends from the outer side in the tire width direction toward the second outer circumferential main groove and is closed without opening to the second outer circumferential main groove, the second lateral lug groove having a wider groove width than a groove width of the first lateral lug groove, and a fourth sipe that extends from a closed end of the second lateral lug groove and is open to the second outer circumferential main groove.

7. The tire according to claim 6, wherein
each of the regions of the first and second lateral land portions is provided with a fifth sipe that extends from the outer side in the tire width direction toward an inner side in the tire width direction in parallel with the first or second lateral lug groove and comprises an opening end open to the first or second outer circumferential main groove, the fifth sipe being different from the fourth sipe, the fifth sipe comprises a shallow sipe portion having a shallower sipe depth than other portions, and the shallow sipe portion comprises the opening end of the fifth sipe, and the shallow sipe portion is provided on a side of the opening end of the fifth sipe with respect to a deep sipe portion having a deeper sipe depth than the shallow sipe portion.

8. The tire according to claim 1, wherein
the first sipe and the second sipe comprise a shallow sipe portion having a shallower sipe depth than other portions, and the shallow sipe portion comprises each of the opening ends of the first or second sipe, and the shallow sipe portion is provided on both sides of a deep sipe portion having a deeper sipe depth than the shallow sipe portion.

9. The tire according to claim 1, wherein
the region of the first intermediate land portion is provided with, as the intermediate lug grooves, first intermediate lug grooves extending in an inclination direction toward a third side in the tire circumferential direction as advancing from an opening to the first outer circumferential main groove toward an inner side in the tire width direction and being closed in the region of the first intermediate land portion without opening to the first inner circumferential main groove, the region of the second intermediate land portion is provided with, as the intermediate lug grooves, second intermediate lug grooves open to the second inner circumferential main groove and the second outer circumferential main groove, the regions of the first and second intermediate land portions are provided with a sixth sipe that extends in parallel with the first or second intermediate lug groove and is open to each of the first outer circumferential main groove and the first inner circumferential main groove or is open to each of the second outer circumferential main groove and the second inner circumferential main groove, the sixth sipe comprises a shallow sipe portion having a shallower sipe depth than other portions, and the shallow sipe portion comprises each of the opening ends of the sixth sipe, and the shallow sipe portion is provided on both sides of a deep sipe portion having a deeper sipe depth than the shallow sipe portion.

10. The tire according to claim 1, wherein
when in a profile cross-section of the tread portion along the tire width direction, an arc in which a tread surface of the center land portion passes through two land edge points connected to groove wall surfaces of the first and second inner circumferential main grooves and each tread surface of the first and second intermediate land portions passes through two land edge points each connected to groove wall surfaces of the first and second inner circumferential main grooves, and a center point of which is located on the tire equator line, is a reference profile line, a profile line formed by the tread surfaces of the center land portion, the first intermediate land portion, and the second intermediate land portion is a bulging profile line that projects toward an outer side in a tire radial direction with respect to the reference profile line.

11. The tire according to claim 1, wherein the tire is designated using letters, symbols or signs such that the second side is on a vehicle outer side when the tire is mounted on a vehicle.

12. The tire according to claim 3, wherein
the region of the second intermediate land portion is provided with, as the intermediate lug grooves, second intermediate lug grooves open to the second inner circumferential main groove and the second outer circumferential main groove, and
the second intermediate lug groove comprises a shallow groove portion having a shallower groove depth than other portions, and the shallow groove portion is on the second side with respect to a deep groove portion having a deeper groove depth than the shallow groove portion so as to comprise an opening end open to the second outer circumferential main groove.

13. The tire according to claim 12, wherein
the second intermediate lug grooves comprise:
a pair of inclined groove portions that approach each other as advancing from the opening ends each open to the second inner circumferential main groove and the second outer circumferential main groove toward one side in the tire circumferential direction; and
a groove turning portion that connects ends of the pair of inclined groove portions and is bent so as to project toward the one side in the tire circumferential direction,
a length of an inclined groove portion on the second side among the pair of inclined groove portions is longer than a length of the inclined groove portion on the first side, and
the shallow groove portion is provided within a range of the inclined groove portion on the second side among the pair of inclined groove portions.

14. The tire according to claim 13, wherein
a first lateral land portion and a second lateral land portion that continue to a ground contact edge in the tire width direction are provided on outer sides in the tire width direction of the first and second outer circumferential main grooves, respectively,
a region of the first lateral land portion is provided with a first lateral lug groove that extends from the outer side in the tire width direction toward the first outer circumferential main groove and is open to the first outer circumferential main groove, and
a region of the second lateral land portion is provided with a second lateral lug groove that extends from the outer side in the tire width direction toward the second outer circumferential main groove and is closed without opening to the second outer circumferential main groove, the second lateral lug groove having a wider groove width than a groove width of the first lateral lug groove, and a fourth sipe that extends from a closed end of the second lateral lug groove and is open to the second outer circumferential main groove.

15. The tire according to claim 14, wherein
each of the regions of the first and second lateral land portions is provided with a fifth sipe that extends from the outer side in the tire width direction toward the inner side in the tire width direction in parallel with the first or second lateral lug groove and comprises an opening end open to the first or second outer circumferential main groove, the fifth sipe being different from the fourth sipe,
the fifth sipe comprises a shallow sipe portion having a shallower sipe depth than other portions, and the shallow sipe portion comprises the opening end of the fifth sipe, and
the shallow sipe portion is provided on a side of the opening end of the fifth sipe with respect to a deep sipe portion having a deeper sipe depth than the shallow sipe portion.

16. The tire according to claim 15, wherein
the first sipe and the second sipe comprise a shallow sipe portion having a shallower sipe depth than other portions, and the shallow sipe portion comprises each of the opening ends of the first or second sipe, and
the shallow sipe portion is provided on both sides of a deep sipe portion having a deeper sipe depth than the shallow sipe portion.

17. The tire according to claim 16, wherein
when in a profile cross-section of the tread portion along the tire width direction, an arc in which a tread surface of the center land portion passes through two land edge points connected to groove wall surfaces of the first and second inner circumferential main grooves and each tread surface of the first and second intermediate land portions passes through two land edge points each connected to groove wall surfaces of the first and second inner circumferential main grooves, and a center point of which is located on the tire equator line, is a reference profile line, a profile line formed by the tread surfaces of the center land portion, the first intermediate land portion, and the second intermediate land portion is a bulging profile line that projects toward an outer side in a tire radial direction with respect to the reference profile line.

18. The tire according to claim 17, wherein the tire is designated using letters, symbols or signs such that the second side is on a vehicle outer side when the tire is mounted on a vehicle.

* * * * *